United States Patent [19]

Kennel et al.

[11] Patent Number: 5,039,475
[45] Date of Patent: Aug. 13, 1991

[54] THERMIONIC FUEL ELEMENT PRESSURE VESSEL

[75] Inventors: Elliot B. Kennel; Mark S. Perry, both of Dayton; John E. Leland, Londonville, all of Ohio

[73] Assignee: The United States of America as represented by the Secretary of the Air Force, Washington, D.C.

[21] Appl. No.: 547,252

[22] Filed: Jul. 2, 1990

[51] Int. Cl.$^5$ .............................................. G21D 7/02
[52] U.S. Cl. .................................................. 376/321
[58] Field of Search ............... 376/320, 321, 366, 367, 376/401

[56] References Cited

U.S. PATENT DOCUMENTS

| | | | |
|---|---|---|---|
| 3,520,776 | 7/1970 | Charrault et al. | 376/401 |
| 3,793,144 | 2/1974 | Magladry | 376/320 |
| 4,008,407 | 2/1977 | Fletcher et al. | 310/4 R |
| 4,040,903 | 8/1977 | Monroe, Jr. | 376/321 |
| 4,085,004 | 4/1978 | Fletcher et al. | 310/4 R |
| 4,163,689 | 8/1977 | Grossman | 376/321 |
| 4,506,183 | 3/1985 | Morris | 310/306 |
| 4,755,350 | 7/1988 | Kennel | 376/321 |

OTHER PUBLICATIONS

Nuclear Thermionic Power System for Spacecraft, W. M. Phillips, Jet Propulsion, ab. California 91103, 11th IECEC.
Heat Pipe Nuclear Reactor for Space Power, Daniel R. Koenig, University of Cal. New Mexico, 11th IECEC.

Primary Examiner—Brooks H. Hunt
Assistant Examiner—F. H. Voss
Attorney, Agent, or Firm—Fredric L. Sinder; Donald J. Singer

[57] ABSTRACT

A pressure vessel for nuclear energy powered thermionic fuel elements is disclosed. An inner cylindrical nuclear fuel heat source is surrounded by cylindrical layers of, in outward order, an emitter, a gap, a collector, an insulator and a cladding layer. A hexagonal pressure vessel surrounds the other parts of the thermionic fuel element and forms liquid metal coolant passages between the inside corners of the hexagon and the cladding. Longitudinally, each thermionic fuel element comprises a middle active zone between two 20% enriched uranium zones to reduce the critical mass of the system for safety. Beryllium zone endcaps act as neutron reflectors and further reduce the critical mass. A plurality of thermionic fuel elements is arrayed into a reactor core with brazed together pressure vessel hexagon sides. In the event of a leak, or other coolant flow failure, the pressure vessel sides act as thermal conduction fins and transfer waste heat to adjacent pressure vessels where coolant flow has not failed.

3 Claims, 2 Drawing Sheets

THERMIONIC FUEL ELEMENT PRESSURE VESSEL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thermionic energy conversion systems, and more specifically to a novel pressure vessel for nuclear energy powered thermionic fuel elements that, as part of a nuclear reactor core made of an array of thermionic fuel elements, provides a nuclear reactor core with true redundancy and that is highly resistant to single point failures.

Thermionic converters directly convert thermal energy, or heat, into electrical energy, or electricity, by heating a metallic emitter to sufficiently high temperatures so that electrons escape the emitter and flow to a cooler collector. The heat source for conversion to electricity may be any of several types, including exothermic chemical reactions and the heat of nuclear fission. In order to promote efficient operation of a thermionic converter to generate useful amounts of electrical power, the converter must not only generate the large amounts of heat needed to energize the hot side thermionic emitter, but must also provide means for rejecting waste heat from the cold side collector.

Nuclear fission powered thermionic converters often have a core made of an array of individual thermionic fuel elements. Each thermionic fuel element, or TFE, typically is a cylinder having a center of fissionable fuel surrounded, in outward order, by cylindrical layers of an emitter, a gap, a collector, an insulator and an outer protective shell. A cylindrical vent, or snorkle, generally extends through the centerline of the fuel for venting gaseous fission products. Conventional cooling systems for cooling the converters enclose the core array of thermionic fuel elements inside a single large pressure vessel. Liquid metal coolant, typically a sodium-potassium alloy or lithium, is circulated through the core around and between the individual thermionic fuel elements, and then between the core and a remote heat exchanger. A single electromagnetic coolant pump and expansion accumulator is generally used to circulate the coolant. This conventional system is, however, subject to single point failure in that a leak anywhere in the cooling system, or a pump or accumulator failure, destroys the entire system. This is particularly undesirable because the primary expected use for nuclear fission powered thermionic converters is in outer space, where extreme reliability is required.

Prior art attempted solutions include adding heat pipes to the core to remove waste heat, thereby eliminating the single liquid metal loop. Unfortunately, these attempts have merely created new problems. For example, to accommodate the heat pipes, particularly heat pipes placed inside individual thermionic fuel elements, the elements have had to be substantially redesigned away from successful state-of-the-art designs. Also, in the event of failure of a single heat pipe, waste heat will travel through an alternate path that typically will result in a several hundred degree increase in the temperature of nuclear fuel in that path. Further, in the event of a possible space launch accident, in which the heat pipes may be sheared off at the reactor, the resulting large voids may fill with water causing the reactor to possibly go critical. The presence of unplanned or unwanted water in a reactor is dangerous because water generally acts as a neutron moderator, slowing down the fission-produced high velocity neutrons, which normally escape the reactor without reaction, to slower thermal neutrons which can trigger further fission reactions and cause unwanted or runaway chain reactions. This danger is particularly acute with so-called out-of-core systems where the heat absorbing evaporator end of a heat pipe is positioned inside a reactor core and the heat emitting condenser end of the heat pipe is the inside heat source of a thermionic converter.

Thus it is seen that there is a need for nuclear fission powered thermionic fuel elements and cores that provide redundancy and do not have single point failure modes.

It is, therefore, a principal object of the present invention to provide a nuclear fission powered thermionic fuel element that, combined with other thermionic fuel elements in a reactor core, has redundancy and eliminates single point failure modes.

It is another object of the present invention to provide a nuclear fission powered thermionic fuel element that combines its other features and advantages with high resistance to runaway chain reactions in the event of non-operational sudden and accidental destruction.

It is a feature of the present invention that it provides an extremely robust reactor, in that the reactor will be able to endure much operational damage and still continue to work adequately and, if the damage is too severe, fail gradually without catastrophic failure.

It is another feature of the present invention that it provides a modular reactor that can easily be scaled up or down to meet different power requirements.

It is an advantage of the present invention that it minimizes the needed volume of coolant making an efficient thermionic reactor of reasonable volume and weight.

It is a another advantage of the present invention that its construction and operation will be straightforward and uncomplicated.

These and other objects, features and advantages of the present invention will become apparent as the description of certain representative embodiments proceeds.

SUMMARY OF THE INVENTION

The present invention provides a novel pressure vessel for enclosing nuclear energy powered thermionic fuel elements that provides, in a nuclear reactor core comprising an array of thermionic fuel elements, true redundancy and high resistance to single point failure modes. The unique discovery of the present invention is that enclosing each nuclear fuel powered thermionic fuel element inside a separate hexagonal pressure vessel and flowing coolant through the spaces formed between the inside corners of the hexagons and the next inner layer of each cylindrical fuel element, and brazing the hexagon outside walls of the individual pressure vessels to each other to form the reactor core, permits, in the event of coolant loss in any one vessel, the hexagon walls to act as thermal conduction fins to remove and transfer waste heat to adjacent fuel elements to share the cooling load and prevent catastrophic failure.

Accordingly, the present invention is directed to a thermionic fuel element comprising a nuclear fuel heat source, an emitter thermally coupled to and generally surrounding the heat source, a collector in a spaced relationship from and generally surrounding the emitter and a pressure vessel generally surrounding the collector, wherein an axial cross-section of the pressure vessel has generally the shape of a polygon. The axial cross-section of the pressure vessel may have generally the shape of a hexagon. The thermionic fuel element may also include means for thermally coupling the pressure vessel to the collector.

The invention is also directed to a thermionic convertor core comprising an array of thermionic fuel elements, wherein each element further comprises a nuclear fuel heat source, an emitter thermally coupled to and generally surrounding the heat source, a collector in a spaced relationship from and generally surrounding the emitter and a pressure vessel generally surrounding the collector. The axial cross-section of each pressure vessel surrounding a collector may have generally the shape of a polygon and the pressure vessels may be arrayed polygon side to polygon side. The axial cross-section of each pressure vessel may have generally the shape of a hexagon. Each thermionic convertor element may also include means for thermally coupling each pressure vessel to its surrounded collector.

The invention is additionally directed to a method for making a thermionic convertor core comprising the step of assembling a plurality of thermionic fuel elements, each element including a nuclear fuel center, wherein each element has generally an outside axial cross-sectional shape of a polygon, so that the thermionic fuel elements are arrayed polygon side to polygon side. The outside axial cross-section of each thermionic fuel element may have generally the shape of a hexagon.

DESCRIPTION OF THE DRAWINGS

The present invention will be more clearly understood from a reading of the following detailed description in conjunction with the accompanying drawings wherein.

DETAILED DESCRIPTION

Figure 1:
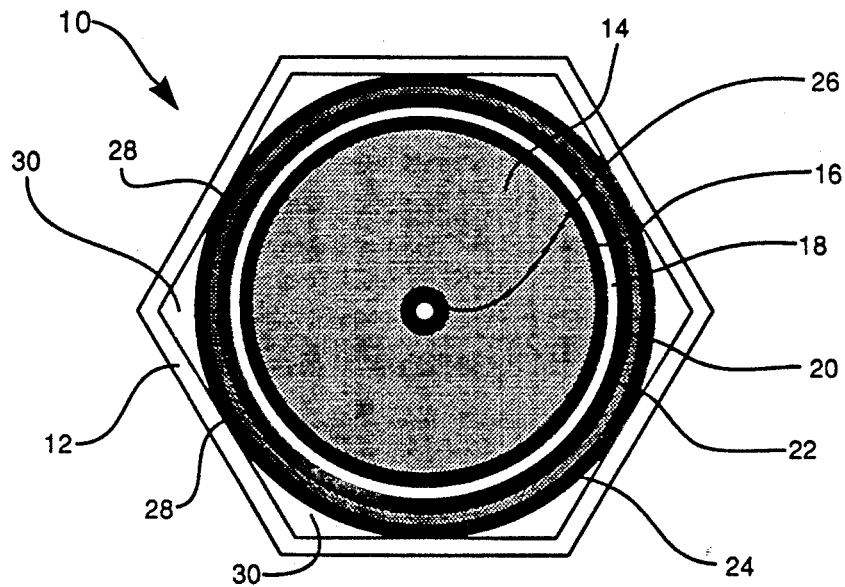
FIG. 1 is a simplified axial cross-sectional view of a thermionic fuel element that includes a single hexagonal pressure vessel housing according to the teachings of the present invention.

Referring now to FIG. 1 of the drawings, there is shown a simplified axial cross-sectional view of a single thermionic fuel element 10 that includes a surrounding hexagonal pressure vessel 12 according to the teachings of the present invention. An inner fuel cylinder 14 of uranium dioxide fuel is surrounded by an alloy emitter 16. A gap 18 separates emitter 16 from a collector 20. Collector 20 is surrounded by an insulator 22 which is in turn surrounded by cladding 24. Lastly, a snorkle 26 runs through the center of inner fuel cylinder 14. In an example embodiment, snorkle 26 is made of tungsten and has an outer diameter of 0.18 inches. Fuel cylinder 14 has an outer diameter of 2.00 cm. Emitter 16 is made of tungsten alloy and has an outer diameter of 2.20 cm. Gap 18 has an outer diameter of 2.28 cm. The gap may be partially filled with cesium vapor. Collector 20 is made of niobium and has an outer diameter of 2.48 cm. Insulator 22 is made of aluminum oxide and has an outer diameter of 2.58 cm. Cladding 24 is made of niobium and has an outer diameter of 2.64 cm. Pressure vessel 12 is made of 0.6 cm stainless steel and is attached to cladding 24, and the other conventional components of thermionic fuel element 10, at location 28 so as to maximize the thermal coupling between those components and pressure vessel 12. The means for attaching may include welding, pressure fitting or other appropriate means. Refractory metals, used for pressure vessel 12 instead of stainless steel, would allow higher operating temperatures. Stainless steel, however, is a good choice because of its reasonable cost. NaK liquid metal coolant flows through passages 30 to remove waste heat from collector 20. Cladding 24 helps maintain compatibility between liquid metal coolant and the rest of thermionic fuel element 10.

Figure 2:
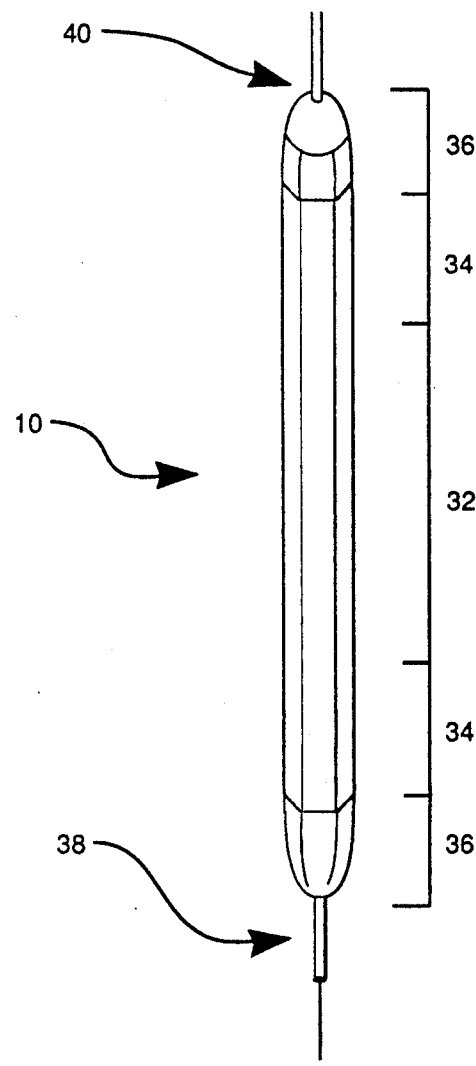
FIG. 2 is a simplified perspective view of the outside of a thermionic fuel element according to the teachings of the present invention; and, FIG. 3 is a simplified axial cross-sectional view of a reactor core made from a plurality of thermionic fuel elements according to the teachings of the present invention.

FIG. 2 is a simplified perspective view of the outside of thermionic fuel element 10. Thermionic fuel element 10 comprises a 30 cm active zone 32 between a pair of 20% enriched uranium nitride zones 34. Each 20% enriched uranium nitride zone is 6 cm long. The 20% enriched uranium zones 34 are enriched with 20% uranium-235, the fissionable isotope of uranium, instead of the nominally 90% uranium-235 enrichment in the active zone. This is an optional feature to reduce the overall critical mass of fissionable material needed to maintain a chain reaction for thermionic fuel element 10 to work. The 20% enriched uranium zones 34 are not capable of maintaining a chain reaction on their own, but contribute additional thermal neutrons to active zone 32 so that a chain reaction can be maintained in active zone 32 with a reduced critical mass. The lower the needed critical mass, the safer the system in the event of sudden accident and possible destruction, such as might occur in a launch accident. Beryllium, or beryllium oxide, zones 36 are 4 cm long and act as neutron reflectors to reflect escaping high velocity neutrons back to active zone 32 as slower thermal neutrons and thereby also reduce the critical mass needed for element 10 to operate and increase safety. Because the critical mass reducing effects of 20% enriched uranium zones 34 and beryllium zones 36 are directional, the probability is reduced that a undesired critical mass may occur as part of more randomly distributed wreckage. Coolant enters thermionic fuel element 10 through coolant inlet 38 and exits through coolant outlet 40.

Figure 3:
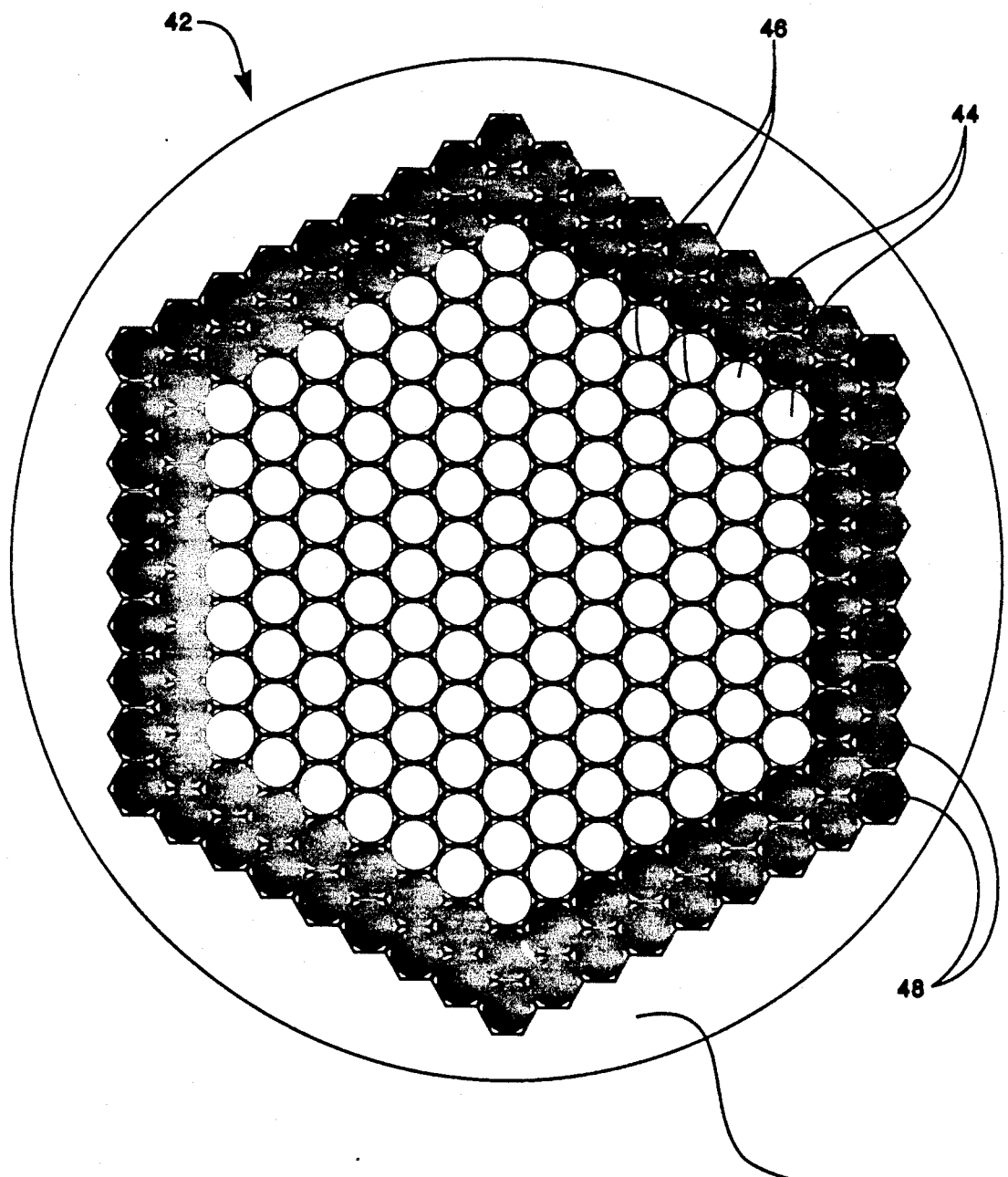

FIG. 3 is a simplified axial cross-sectional view of a reactor core 42 made from a plurality of thermionic fuel elements 44 and their individual pressure vessels 46. Reactor core 42 includes an outer driver zone of 20% enriched fuel elements 48 and a surrounding beryllium zone 50 to reduce the overall critical mass of the entire system for safety as previously discussed. Reactor core 42 is made by brazing together adjacent pressure vessel 46 hexagonal sides. In the event of a leak, or other coolant flow failure, the pressure vessel 46 sides act as coolant fins and transfer waste heat to adjacent pressure vessels 46 where coolant flow continues. To achieve sufficient redundancy and reliability, only two pumps and two accumulators are needed. The pumps and accumulators can be connected, for example, through coolant lines common to many different pressure vessels 46.

The same two pumps and accumulators can also be used to serve other coolant loops to other cores.

The described coolant passages require a smaller coolant volume fraction of the entire system than does the prior art. This provides several advantages. For example, the reactor can be made more compact with fewer voids and therefore a more dense arrangement of nuclear fuel, which allows an even smaller and more efficient core. Also, in the event of an accident scenario where liquid metal coolant is lost, the smaller volume reduces the danger from water entering the coolant passages.

Those with skill in the art of the invention will readily see that the disclosed pressure vessel may have an axial cross-sectional shape of any polygon, subject only to such considerations as, for example, polygons of too many sides may not have sufficient wall length to transfer significant waste heat. Similarly, the pressure vessel (and other parts of the thermionic fuel element) may be a polyhedron and the elements arrayed in a more three dimensional array for the various benefits, such as more dense packing, that are available with that configuration.

The disclosed thermionic fuel element and pressure vessel successfully demonstrates the use of a combination of coupled convective and conductive heat transfer through individual coolant passages and the shape and arrangement of pressure vessel walls that can, in the event of coolant loss, act as cooling fins to transfer waste heat to adjacent pressure vessels, to provide modularity and eliminate single-point failure modes for a nuclear energy powered thermionic energy conversion system. Although the disclosed invention is specialized, its teachings will find application in other areas where difficult cooling and high reliability requirements exist.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A thermionic convertor core, comprising;
   (a) an array of thermionic fuel elements, wherein each fuel element comprises:
      (i) a nuclear fuel heat source;
      (ii) an emitter thermally coupled to and generally surrounding the heat source;
      (iii) a collector in a spaced relationship from and generally surrounding the emitter; and,
      (iv) a pressure vessel generally surrounding the collector; and,
   (b) wherein an axial cross-section of each pressure vessel surrounding a collector has generally the shape of a polygon and the pressure vessels are arranged in physical contact polygon side to polygon side.

2. The thermionic convertor core according to claim 1, wherein the axial cross-section of each pressure vessel has generally the shape of a hexagon.

3. The thermionic convertor cote according to claim 1, wherein each pressure vessel is in physical contact with its surrounded collector at only one point along each polygon side.

* * * * *